Feb. 1, 1966
W. KOBER
3,233,133
ALTERNATING CURRENT GENERATOR
Filed Dec. 4, 1962
4 Sheets-Sheet 1
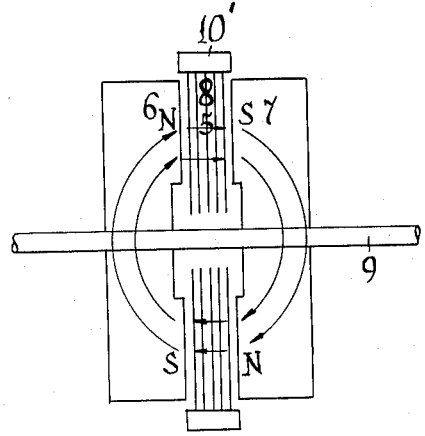
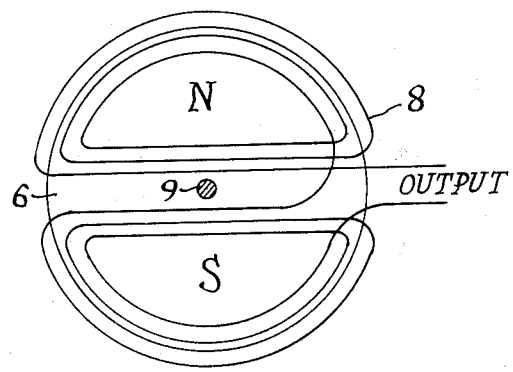
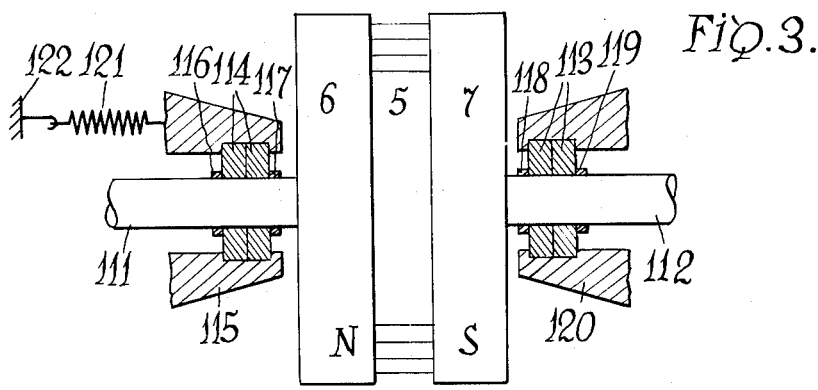
INVENTOR.
William Kober,
BY
Christel & Bean
ATTORNEYS.

Feb. 1, 1966    W. KOBER    3,233,133
ALTERNATING CURRENT GENERATOR
Filed Dec. 4, 1962    4 Sheets-Sheet 2
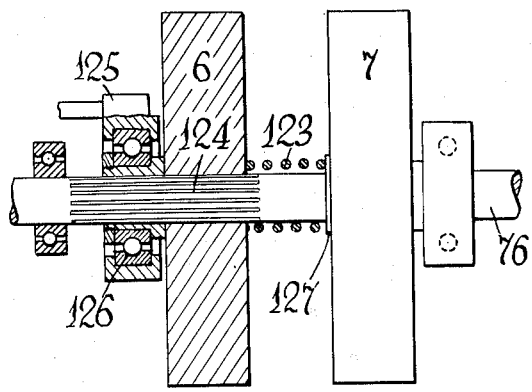
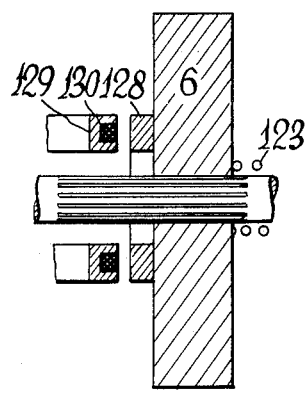
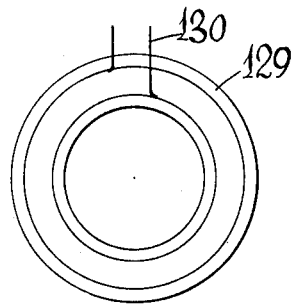
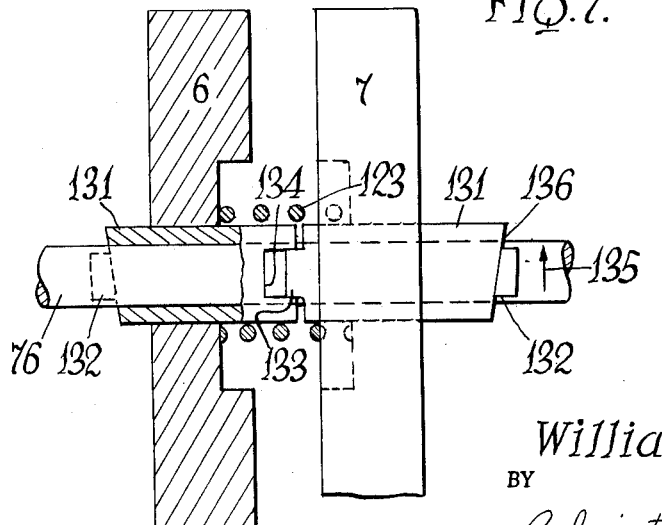
INVENTOR.
William Kober,
BY
Christel & Bean
ATTORNEYS.

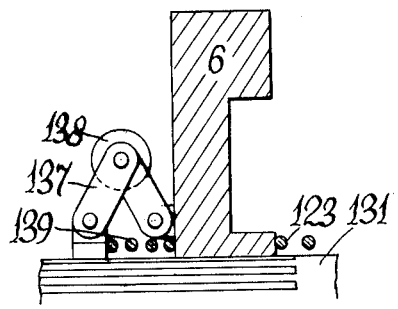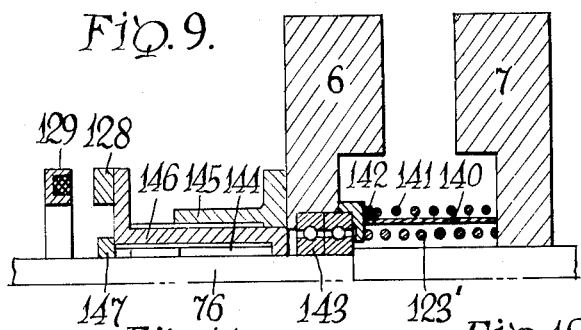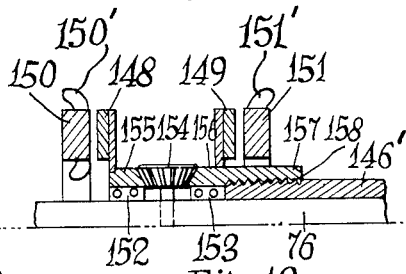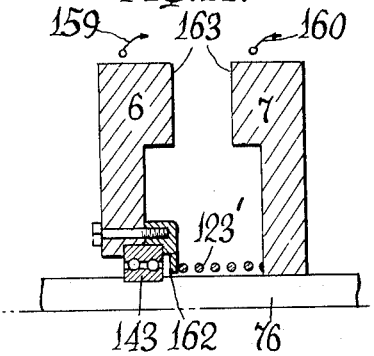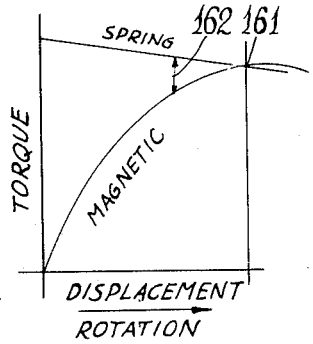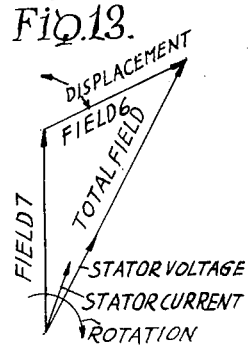

Feb. 1, 1966  W. KOBER  3,233,133
ALTERNATING CURRENT GENERATOR
Filed Dec. 4, 1962  4 Sheets-Sheet 4

INVENTOR.
William Kober,
BY
Christel & Bean
ATTORNEYS.

United States Patent Office 3,233,133
Patented Feb. 1, 1966

3,233,133
ALTERNATING CURRENT GENERATOR
William Kober, Fairport, N.Y., assignor, by mesne assignments, to The Garrett Corporation, Los Angeles, Calif., a corporation of California
Filed Dec. 4, 1962, Ser. No. 242,258
11 Claims. (Cl. 310—191)

This invention relates generally to the electrical art, and more specifically to a new and useful alternating current generator. This application is a continuation-in-part of my pending application Ser. No. 770,029, filed October 28, 1958, now abandoned.

The primary object of this invention is to provide a novel alternating current generator construction making possible a large increase in capacity per unit weight and cost, and a very large reduction in power losses, producing a machine much easier to cool, and having means for controlling and regulating the output characteristics thereof.

An alternating current generator constructed in accordance with my invention is characterized by the provision of opposed field producing structures substantially eliminating the transmission of flux between poles, and having means for moving one field producing structure relative to the other thereof, for control purposes.

These and other objects, characterizing features and advantages will become apparent from the following detailed specification and drawings, which latter are essentially diagrammatic, wherein like reference numerals denote like parts throughout and wherein:

FIG. 1 is a longitudinal sectional view of the basic alternator construction of my invention;

FIG. 2 is an end elevational view of a field producing structure and the armature winding of FIG. 1;

FIG. 3 is a longitudinal sectional view showing the field structures of FIG. 1 carried by separate shafts, and mounted for adjustment of air gap length;

FIG. 4 is a similar view, but showing a modified arrangement utilizing a common or through mounting shaft;

FIG. 5 is a fragmentary, longitudinal sectional view, similar to that of FIG. 4 but showing an electro-magnet control arrangement;

FIG. 6 is an end elevational view of the electro-magnet of FIG. 5;

FIG. 7 is a longitudinal view, partly in section and partly in side elevation, of another air gap length adjusting arrangement;

FIG. 8 is a fragmentary, longitudinal quarter-sectional view, similar to that of FIG. 5 but showing a speed responsive control arrangement;

FIG. 9 is a longitudinal quarter-sectional view of an arrangement for varying the magnetic displacement, rotationally, of one field structure relative to the other;

FIG. 10 is a fragmentary, longitudinal quarter-sectional view of still another displacement control arrangement;

FIG. 11 is a longitudinal quarter-sectional view of an internal force responsive arrangement for varying the magnetic displacement of one field structure relative to the other thereof;

FIGS. 12 and 13 are graphical and vectorial illustrations, respectively, of the force relations involved in the arrangement of FIG. 11;

Figure 14:
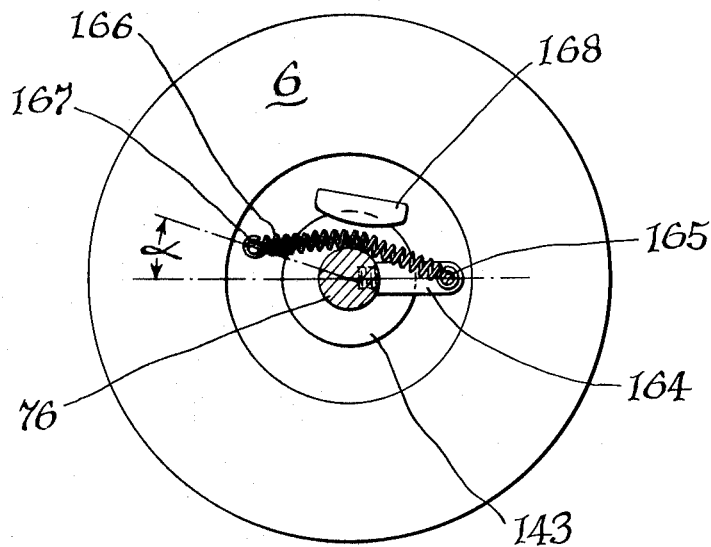
FIG. 14 is a transverse sectional view, showing a modification.
Figure 15:
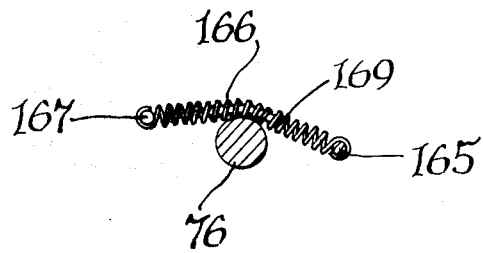
FIG. 15 is a fragmentary, detail view, showing a modification of FIG. 14.

FIGS. 1 and 2 show basic arrangement of this invention. It takes the form of an axial air gap dynamo, but there is no stator iron at all. The two field producing structures 6 and 7 face each other across air gap 5 which need only be the relatively short distance required to accommodate winding 8. The armature winding 8 obtains no support from stator iron and so requires other methods of support, one supporting structure being indicated by the frame 10'. The winding 8 may or may not contain stator type teeth.

The advantages of this basic construction, and details of examples of suitable field producing structures 6 and 7, and armature windings 8, are fully set forth in my pending applications Serial No. 770,029, filed October 28, 1958 and Serial No. 192,122, filed May 3, 1962. This application is concerned with the control and regulation of such a dynamo, and therefore a detailed description of such field producing structures and armature windings is thought to be unnecessary herein. Reference is hereby made to my said pending applications Serial No. 770,029 and 192,122, for any such details.

In permanent magnet field generators, means for varying the voltage, either manually, under control of an external regulator, or automatically as a result of internal forces in the generator, are often required.

The invention includes different methods of varying or regulating the terminal voltage of a permanent magnet field type generator to obtain a desired output characteristic. It must be noted that the invention also includes electromagnet field types, and in that case, voltage control is preferably by field current control, although the methods used for permanent magnets, particularly those giving automatic regulation as a result of internal forces, are often of value. The methods with permanent magnet fields are:

(1) Varying the distance between the two field structures, or varying the air gap.

(2) Changing the angular relation of the two field structures, or varying the phase of the two fields.

Illustrative arrangements for controlling by these methods are shown in FIGS. 3-15, in which armature windings 8 are omitted for clarity and ease of illustration.

FIG. 3 shows two fields 6 and 7, as in FIG. 1. Field 7 is mounted on shaft 112, which is driven by the mechanical power source, not shown. Field 6 is mounted on a separate shaft 111, being mounted on bearings 114 supported by housing frame part 115. In normal position, fields 6 and 7 have north and south poles facing each other, and hence in FIG. 3, field 6, even when free, will set itself in proper polar relationship. This arrangement has no shaft through the interpole area 5, which is desirable in some mechanical field arrangements, and particularly wound field arrangements.

For method 1, in FIG. 3, the field 6 can be moved to vary the magnetic gap to field 7 by making the part 115 adjustable or movable with respect to frame part 120. This control may be manual, or derived from a motor or electro-dynamometer or other mechanical or hydraulic moving device, all under control of a regulator device working on the voltage, vectorial current or frequency output of the generator, singly or in combination. The force of attraction between fields 6 and 7 may be substantially neutralized by a spring such as 121, in FIG. 3, attached in tension between a point 122 fixed in relation to part 120, and part 115 which is the adujstable element. The spring force and magnetic force curve both strengthen with closer approach of 6 to 7, and weaken with separation, so that substantial balance is retained over the range of adjustment.

A method similar to that of FIG. 3, but in which the through shaft 76 is retained is shown in FIG. 4. Here, field 6 cannot rotate, but can slide axially on spline 124, which axial motion is applied through clutch-type bearing 126 from point 125. Spring 123, in compression, serves the same purpose as spring 121 of FIG. 3, and may also be chosen of such force and rate that the magnetic force between 6 and 7 is substantially balanced over the range of motion desired. Spacing washer 127 may be used to help adjust the spring characteristics.

In FIG. 5, a ring shaped armature 128 of magnetic material is attached to axially slidable field 6. Electromagnet 129 has winding 130 formed in a circle (see FIG. 6) and placed in the groove of 129. Armature 128 and electromagnet 129 are attracted to each other when current flows in coil 130. The current in coil 130 is controlled by a regulator. Since spring 123 in compression substantially balances the normal force between 6 and 7, moderate forces developed by 123 and 129 will move 6 and 7 axially, controlling the field between 6 and hence the voltage in the winding. An electromagnet and armature of the type 128, 129 has a substantially constant flux with rotation of the part 128, and so no eddy-current or other magnetic losses are incurred. Also, there is no mechanical friction during rotation.

As described in my Patent 2,824,275, the mechanical torque required to turn the shaft of a generator varies substantially in proportion to the electrical power being taken out. At a constant power factor of the electrical load, the voltage drop due to that load is also substantially proportional to the electrical output. Thus, the air gap between fields, if varied in proportion to the shaft mechanical torque, will be able to reduce voltage drop due to load, or if enough motion is produced, to actually increase voltage as electrical load is applied. Normally, a relationship of air-gap change to torque is chosen to give a substantially constant output voltage at all loads, but in special cases, under or over-correction are preferred.

In FIG. 7, the arrangement is similar to FIG. 4. Field 6, however, is fastened to one sleeve 131, which slides axially on shaft 76. Field 7 is similarly fastened to a similar sleeve. The two sleeves have mating notches 133, 134, which keep them in constant angular relation. This action is preferred, but not essential, as the magnetic interaction of fields 6 and 7 will act to keep them in line. When the two sleeves bottom against each other, the gap between pole faces is at a minimum for safe clearance of the stator. Spring 123 is stiff enough to much more than overcome the magnetic pull between fields 6 and 7, and normally holds the spiral or cam shaped ends 136 of the sleeves 131 in contact with projections 132, which are fastened rigidly to the shaft 76. The shaft is driven in the direction of arrow 135. When electrical load is applied, it tends to hold back both fields 6 and 7. This produces a torque between the sleeves and the shaft, and 132 tends to move forward on the sloped surfaces 136, forcing fields 6 and 7 closer together. This increases the field strength in the air gap and in the winding, increasing the voltage generated to offset the voltage drop caused by the electrical load current.

The voltage generated also varies in proportion to the speed of rotation. This change may be corrected for at the same time that load change is corrected for, by means according to FIG. 8. FIG. 8 is similar to FIG. 7, except that field 6 is now able to slide but not rotate on sleeve 131, by means of mating splines. Fly ball system of links and weights 137, 138, will now tend to move field 6 away from field 7 as speed increases, thus acting to decrease the generated voltage to compensate for the speed increase. The speed device may be mounted on either field 6 or 7, or both may have a similar device. Compression spring 123 may also be used to work against the centrifugal pull. A separate spring 139 may also be provided for this purpose.

Fields 6 and 7 have until now always been placed with north poles on one exactly opposite to south poles on the other. If the fields are rotated relative to each other away from this position, the magnetic field in the gap is weakened, and a displacement of 180 magnetic degrees, bringing north to north and south to south will bring the field to nearly zero. Thus, it is possible to control the working field, and thus the stator voltage by rotating one field with respect to the other.

Manual adjustment, with the generator not running may be made as described in my pending application Serial No. 192,122, filed May 3, 1962, with reference to FIG. 16 thereof.

Permanent magnet generators for a normal type of load, having about a .8 lagging power factor, have a no load voltage to full load voltage ratio of about 1 to .6 when loaded to absolute maximum capacity. Such loading is not usually advisable in design, and a ratio of 1 to .75 is common. Thus, a corresponding range of generated voltage or flux is required for maintaining a constant output voltage. If a considerable speed variation exists in the prime mover, this will also have to be added to the range.

Thus, a flux density range of about 1 to .7 is required. When the density is changed by phase displacement of the fields, this requires a shift of about 90 magnetic pole degrees, or a north pole on one field is opposite to a neutral point on the other. In a 4 pole machine, this is 45 mechanical degrees. In a 6 pole machine, it is 30 mechanical degrees.

The fields, when displaced from the north-south maximum flux alignment, require at first a force proportional to the angular displacement. Toward the 90° point, the force continues to increase with displacement, but at a diminishing rate. The force-displacement curve depends to a considerable extent on pole face shape, flux distribution, etc., but the curve is approximately a sine curve, or torque sine $\theta$, where $\theta$ is the displacement in magnetic pole degrees from the north-south position.

In making the field phase displacement type regulator to be operated from outside by manual control or a motor force derived from a regulator based on the generator output, it is desirable to essentially neutralize the above described torque force in the rotating system itself. Numerous non-linear spring arrangements are familiar in the art, and a suitable one may be chosen. In FIG. 9, an arrangement for control of the field phase from an external point is shown.

Field 6 is mounted on a suitable thrust bearing 143 on shaft 76, which will also hold field 6 from wobbling laterally. A double row angular contact bearing known in that art is suitable. Spring 123 is designed to be long and approximately constant in force and balance the magnetic force developed at some intermediate displacement. Spring 123 is covered by tube 140, and another spring 141 may be placed over this tube and arranged to modify the action of spring 123, whereby the magnetic torque is approximately balanced at all positions. Spring 141 is not in engagement over the entire range of motion of field 6, but is picked up by boss 142 at a desired point in the movement, thus supplying a non-linear force response. More than two springs may be used to refine the spring torque curve, and the method is adapted to any pole number and any actual magnetic torque curve.

Shaft 76 has a twisted spline 144 mounted on it, and field 6 has an oppositely twisted spline 145 on it. Sleeve 146 mates with both 144 and 145, so that as 146 is moved endwise, it imparts relative rotation between shaft 76 and field 6. The motion of sleeve 146 is controlled by electro-magnet 128, 129 as described for FIG. 5. A clutch bearing system, as described for bearing 126 of FIG. 4 also could be readily placed on sleeve 146, so that manual or electrodynamometer control may be applied from equipment external to the generator itself. The sleeve 146 is stopped at both ends of its travel, at one end by the ending of the spline near bearing 143, and at the other by stop 147 which is removable to permit disassembly of the spline system.

The above systems for introducing control to the rotating field system from the stationary outside works along the shaft axis, since there is no motion in this direction, and a force does not imply a considerable energy input, as it would in the direction of rotation. However, it is also practical to develop a rotational control force, if it is given a large mechanical advantage over the resulting field motion, and particularly if the mechanical power of the generator shaft is used to supply the energy involved. FIG. 10 shows such a system. Here, 148 is a disc acting as an induction motor rotor. Its armature is 150, with a winding 150' like that of a motor. To 148 is attached a bevel gear 155, and the two are mounted to shaft 76 by a suitable bearing 152, such as a double-row ball bearing. Disc 149, armature 151, winding 151', bevel gear 156 and bearing 153 are similar. Meshing bevel pinion 154 has its shaft fixed in shaft 76, and its function is to secure a reverse motion of sleeve 157 when 148 and 149 are actuated in turn. Sleeve 157 extends from bevel gear 156, and has a thread 158, which meshes with a thread on sleeve 146'. Sleeve 146' is the same as 146 of FIG. 9 in its connection to field 6. Sleeve 146' may also be connected to field 6 in FIG. 4, and so actuate the variable air gap system.

In operation, a control D.C. current is passed through armature 150. This causes a drag on disc 148, which disc is in rotation. The drag causes rotation of 148 with respect to shaft 76, and transmission through the gears to collar 157, where the thread moves 146 axially. The thread gives a large mechanical advantage to the motion from disc 148 to motion of field 6. When direct current is applied to armature 151, a similar action, but with opposite rotation of sleeve 146' is produced. Because of the large mechanical advantage noted, the torque required at discs 148 and 149 is moderate, and the direct current energy is the armatures 150, 151 is again on a much lower level than that which it controls in the discs 148, 149.

A similar result can be obtained by a simpler mechanical but more complicated electrical system, as follows. In FIG. 10, eliminate 148, 150, 152, 155, 154 and 156. This leaves one disc 149, its stator armature 151, bearing 153, sleeve 157 and sleeve 146'. Stator 151 is now supplied alternately, to secure opposite forces on disc 149, by a frequency below the shaft speed, and one above the shaft speed. These frequencies are generated by separate equipment, not shown, and controlled in application to stator 151 by modulating equipment (not shown) responsive to generator output voltage, frequency current, or other characteristic as desired. One particular system for a 4 pole generator is to use a 2 pole winding in 151. Then direct current as before will serve as the lower frequency, and part of the output of the main generator 6, 7 is used for the higher frequency, since the rotational speed of motor 149, 151 is twice that of shaft 76 due to the four pole, two pole ratio. Motor 149, 151 may also have four poles, and operate on direct current and current produced by a frequency doubler from part of the output of the main generator.

Returning to the system of FIG. 10, this will also operate if discs 148 and 149 become friction discs, and stators 151 become brake discs, which are moved mechanically into frictional contact with discs 148 and 151 alternately for opposite final motion on field 6.

The phase difference adjustment of the field can take place automatically, in response to forces present in the generator, and this is a very excellent system because of its great similicity. In FIG. 11, the parts are similar to those of FIG. 9, but all the control equipment of FIG. 9 is omitted. Field 6 is mounted on bearing 143, and spring 123' has numerous turns, so that its torque does not vary much over the control region of rotation of field 6, which is about 90 degrees for a two pole, 45 degrees for a four pole, etc. as previously explained. FIG. 12 shows typical torque relations for the spring and magnetic force. FIG. 12 shows the way the fields 6 and 7 combine their flux when displaced, the vector resultant being the total field and the generated voltage in the stator is proportional to this. In FIG. 11, spring 123 is set so that it displaces field 6 from its normal north to south relation with field 7. The new balance is reached at intersection point 161, FIG. 12 of the spring and magnetic force curves. A stop 162 to rotation of field 6 on shaft 76, FIG. 11 is provided at this point, and there is another at the maximum field position indicated in FIG. 12.

When the stator is loaded electrically, current flows in it, which will exert a retarding torque on both field 7 and field 6. Field 7 is tight on the shaft, and simply loads the prime mover. Field 6, however, will find a new position 162, FIG. 12, where spring torque, magnetic field-to-field torque and stator current torque balance. At this new, smaller displacement, the total field, FIG. 13, will be greater, and hence so will the generated voltage. This increase will counteract the unavoidable internal generator drop due to the increased load current.

The spring force characteristic shown is for the simple spring 123. It is often preferred to use a double spring, as 123, 142 of FIG. 9, or even more springs, or some other non-linear system, whereby a desired displacement and resulting generated voltage change can be produced for a given load current torque.

When using the system of FIG. 9, it is preferred that the pole pieces have a conducting shield, or a damper, to prevent oscillation of field 6 about its normal position. A mechanical type of damper may be used if none of these devices, which produce magnetic damping are present. Since the shield or damper, or both, are usually present for other design reasons, the magnetic damper is the usual form. The damper is indicated in FIG. 11 by numeral 163.

One simple form of spring that has a good non-linear characteristic for balancing the magnetic force between fields 6 and 7 is shown in FIG. 14. In FIG. 9, if shaft 76 is cut between fields 6 and 7, and the view taken toward field 6, we have FIG. 14, with field 6 and shaft 76 as shown. In place of springs 123', 141 and associated parts, we now have parts 164 fastened rigidly to shaft 76 and projecting radially therefrom. Adjacent its outer end, arm part 164 carries pin 165 with an appropriate fastening point for one end of a tension spring 166. The other end of spring 166 is fastened to pin 167, which is attached to the movable field part 6. Assuming the spring to have a tightly coiled winding when free, the force between its ends when mounted as in FIG. 14 is substantially constant over a considerable range of length. The lever arm by which it applies torque to field 6 is approximately equal to $\sin \alpha$. Thus, the torque applied is proportional to $\sin \alpha$ and increases as $\sin \alpha$ increases. Therefore, it has the same force characteristic as the magnetic pull torque between fields 6 and 7, but oppositely directed, as the torque between 6 and 7 is approximately $\sin \theta$, and directed to move toward $\theta =$ zero. Thus, is $\alpha$ and $\theta$ are made approximately equal, so that when 6 and 7 are in exact N–S opposition, $\alpha$ is zero, the spring produced torque will substantially balance the magnetic torque at all positions.

As shown, the spring 166 will contact the shaft 76 when $\alpha$ is small, but this does little harm in practice. When the running speed is high, spring 166 will tend to bend out in its center, away from shaft 76, because of centrifugal force, and this may cause interference with its proper torque characteristic. A guide 168, fastened to field structure 6 and in proper relation to spring 166 will prevent excessive bending in an obvious manner, while still permitting free motion. Another means of controlling spring 166 is to place a guide 169 (FIG. 15) inside it, on which spring 166 may slide as it expands and contracts. The guide may be bent as shown to permit the spring to detour around shaft 76 as angle α becomes small.

Having fully disclosed my invention, and described its mode of operation, what I claim as new is:

1. A dynamoelectric machine comprising, multiple field producing structures each having north and south poles with the north and south poles of one structure positioned proximate the south and north poles, respectively, of the other structure, means mounting said structures for rotation about an axis, an armature winding having portions poistioned in the flux path between said proximate poles, whereby transmission of flux occurs only across the relatively short air gap between said proximate poles, and means mounting one of said structures for movement relative to the other thereof to produce a desired output characteristic.

2. A dynamo as set forth in claim 1, wherein said one structure is mounted for movement relative to the other thereof along said axis, thereby to vary the length of said air gap.

3. A dynamoelectric machine comprising, multiple field producing structures each having north and south poles with the north and south poles of one structure positioned proximate the south and north poles, respectively, of the other structure, means mounting said structures for rotation about an axis, an armature winding having portions positioned in the flux path between said proximate poles, whereby transmission of flux occurs only across the relatively short air gap between said proximate poles, and means mounting one of said structures for movement relative to the other thereof to produce a desired output characteristic, wherein said one structure is mounted for angular motion relative to the other thereof, thereby to vary the relative phase of said structures.

4. A dynamo as set forth in claim 1, together with speed responsive means for so moving said one structure.

5. A dynamo as set forth in claim 1, wherein said one structure is mounted for movement in response to internal torque forces resulting from changes in electrical loading.

6. A dynamo as set forth in claim 1, together with electro-magnetic means for moving said one structure.

7. A dynamo as set forth in claim 1, together with means translating a control motion in the direction of said axis into movement of said one structure about said axis.

8. A dynamoelectric machine comprising multiple field producing structures each having north and south poles with the north and south poles of one structure positioned proximate the south and north poles, respectively, of the other structure, means mounting said structures for rotation about an axis, an armature winding having portions positioned in the flux path between said proximate poles, whereby transmission of flux occurs only across the relatively short air gap between said proximate poles. and means mounting one of said structures for movement relative to the other thereof to produce a desired output characteristic, wherein said one structure is mounted for movement in response to internal torque forces resulting from changes in electrical loading, and wherein said one structure is mounted for rotation about said axis in response to internal torque forces.

9. A dynamo as set forth in claim 5, wherein said one structure is mounted for movement along said axis in response to internal torque forces.

10. A dynamoelectric machine comprising multiple field producing structures each having north and south poles with the north and south poles of one structure positioned proximate the south and north poles, respectively, of the other structure, means mounting said structures for rotation about an axis, an armature winding having portions positioned in the flux path between said proximate poles, whereby transmission of flux occurs only across the relatively short air gap between said proximate poles, and means mounting one of said structures for movement relative to the other thereof to produce a desired output characteristic, wherein said one structure is mounted for movement in response to internal torque forces resulting from changes in electrical loading, and wherein said one structure is mounted for movement along and about said axis in response to internal torque forces.

11. A dynamoelectric machine comprising, multiple field producing structures having opposed proximate poles, means mounting said structures for rotation about an axis, an armature winding having portions positioned in the flux path between said proximate poles, and means mounting one of said structures for movement relative to the other thereof to produce a desired output characteristic.

References Cited by the Examiner

UNITED STATES PATENTS

| | | | |
|---|---|---|---|
| 514,907 | 2/1894 | Bush | 310—268 |
| 2,479,589 | 8/1949 | Parker | 310—268 |
| 2,573,283 | 10/1951 | Seilz | 310—268 |
| 2,736,831 | 2/1956 | Adam | 310—268 |
| 2,824,275 | 2/1958 | Keber | 310—268 |
| 2,847,589 | 8/1958 | Haydon | 310—268 |

JOHN F. COUCH, *Primary Examiner.*